(12) United States Patent
Rygaard

(10) Patent No.: US 7,735,134 B2
(45) Date of Patent: Jun. 8, 2010

(54) JUMPING APPLICATION SECURITY SYSTEM

(75) Inventor: Christopher A. Rygaard, Sunnyvale, CA (US)

(73) Assignee: Aramira Corporation, Moffett Field, CA (US)

( * ) Notice: Subject to any disclaimer, the term of this patent is extended or adjusted under 35 U.S.C. 154(b) by 1105 days.

(21) Appl. No.: 10/686,886

(22) Filed: Oct. 15, 2003

(65) Prior Publication Data

US 2004/0139345 A1 Jul. 15, 2004

Related U.S. Application Data

(60) Provisional application No. 60/419,312, filed on Oct. 16, 2002, provisional application No. 60/419,288, filed on Oct. 16, 2002.

(51) Int. Cl.
*G06F 11/00* (2006.01)
*H04L 9/00* (2006.01)

(52) U.S. Cl. .............................. 726/22; 726/26; 726/27

(58) Field of Classification Search ............. 726/22–25, 726/26–27; 713/187–188; 717/168, 171, 717/172–173; 709/223–226
See application file for complete search history.

(56) References Cited

U.S. PATENT DOCUMENTS

| 5,633,932 | A | | 5/1997 | Davis et al. |
|---|---|---|---|---|
| 5,850,516 | A | | 12/1998 | Schneier |
| 5,850,517 | A | | 12/1998 | Verkler et al. |
| 5,930,514 | A | * | 7/1999 | Thompson et al. .......... 717/170 |
| 5,963,731 | A | | 10/1999 | Sagawa et al. |
| 5,968,176 | A | | 10/1999 | Nessett et al. |
| 5,974,549 | A | | 10/1999 | Golan |
| 6,006,328 | A | * | 12/1999 | Drake .......................... 726/23 |
| 6,009,456 | A | | 12/1999 | Frew et al. |
| 6,065,039 | A | * | 5/2000 | Paciorek ..................... 709/202 |
| 6,065,118 | A | | 5/2000 | Bull et al. |
| 6,141,754 | A | | 10/2000 | Choy |
| 6,148,327 | A | | 11/2000 | Whitebread et al. |
| 6,173,405 | B1 | | 1/2001 | Nagel |
| 6,189,103 | B1 | | 2/2001 | Nevarez et al. |
| 6,192,354 | B1 | | 2/2001 | Bigus et al. |
| 6,233,601 | B1 | * | 5/2001 | Walsh ......................... 709/202 |
| 6,272,528 | B1 | | 8/2001 | Cullen et al. |
| 6,308,181 | B1 | | 10/2001 | Jarvis |
| 6,330,588 | B1 | * | 12/2001 | Freeman ..................... 709/202 |
| 6,539,416 | B1 | | 3/2003 | Takewaki et al. |
| 6,615,232 | B2 | | 9/2003 | Suzuki et al. |

(Continued)

FOREIGN PATENT DOCUMENTS

EP 0942370 A1 9/1999

OTHER PUBLICATIONS

Jansen et al. NIST—Special Publication 800-19—Mobile Agent Security.*

(Continued)

*Primary Examiner*—Hosuk Song
*Assistant Examiner*—Randal Moran
(74) *Attorney, Agent, or Firm*—Fish & Richardson P.C.

(57) ABSTRACT

A jumping application security system and method provides known safe code for the jumping applications on each jump. A participating host specifies the desired code by describing the desired behavior. The security system provides the specified code on behalf of the host.

26 Claims, 6 Drawing Sheets

U.S. PATENT DOCUMENTS

| | | | |
|---|---|---|---|
| 6,622,157 | B1 | 9/2003 | Heddaya et al. |
| 6,711,583 | B2 * | 3/2004 | Chess et al. .............. 707/104.1 |
| 7,046,995 | B2 * | 5/2006 | Rygaard ..................... 455/418 |
| 7,082,604 | B2 * | 7/2006 | Schneiderman ............. 718/100 |
| 2003/0126457 | A1 * | 7/2003 | Kohiyama et al. .......... 713/193 |

OTHER PUBLICATIONS

Jansen et al., "Mobile Agent Security" NIST Special Publication 800-19, pp. 1-38, Aug. 1999.

W.A. Jansen, "A Privilege Management Scheme for Mobile Agent Systems" NIST May 2001.

Wayne Jansen, "Countermeasures for Mobile Agent Security", NIST Nov. 2000.

Wayne Jansen et al., "Privilege Management of Mobile Agents", NIST Oct. 2000.

W. Jansen, "Intrusion Detection with Mobile Agents" Computer Communications Journal, Special Issue on Intrusion Detection Oct. 2, 2001.

"Jumping Beans™ White Paper" Ad Astra Engineering, Incorporated Dec. 1998.

*Intrusion Detection with Mobile Agents*, Computer Communications Journal, Special Issue on Intrusion Detection, Jansen.

*Determining Privileges of Mobile Agents*, Proceedings of the Computer Security Applications Conference, Dec. 2001. Jansen.

*A Privilege Management Scheme for Mobile Agent Systems*, First International Workshop on Security of Mobile Multiagent Systems, Autonomous Agents Conference, May 2001, Jansen.

*A Denial of Service Resistant Intrusion Detection Architecture*, Computer Networks, Special Issue on Intrusion Detection, Elsevier Science BV, Nov. 2000. Mell et al.

*Countermeasures for Mobile Agent Security*, Computer Communications, Special Issue on Advanced Security Techniques for Network Protection, Elsevier Science BV, Nov. 2000, Jansen.

*Privilege Management of Mobile Agents*, National Information System Security Conference, Oct. 2000. Jansen et al.

*Mobile Agent Attack Resistant Distributed Hierarchical Intrusion Detection Systems*, Second International t Workshop on Recent Advances in Intrusion Detection, Sep. 1999, Purdue University, Mell et al.

*Applying Mobile Agents to Intrusion Detection and Response* NISTIR 6416, Sep. 1999. Jansen et al.

*Mobile Agent Security*, NIST Special Publication 800-19, Aug. 1999. Jansen et al.

*Agents for the Masses: Is it Possible To Make Development of Sophisticated Agents Simple Enough To Be Practical?* IEEE Intelligent Systems, Special issue on Agents, May-Jun. 1999. Bradshaw et al.

*Network Security Testing Using Mobile Agents* Third International Conference and Exhibition on the Practical Application of Intelligent Agents and multi-Agent Technology. London, UK Mar. 1998. Karygiannis.

*A Framework For Multi-Mode Authentication: Overview and Implementation Guide*, NISTIR 7046 Aug. 2003. Jansen et al.

*Picture Password: A Visual Login Technique for Mobile Devices*. NISTIR 7030. Jul. 2003. Jansen et al.

*Security Policy Management for Handheld Devices*. The Int'l Conference on Security and Management (SAM'03), Jun. 2003. Jansen et al.

*Authenticating Users on Handheld Devices*, Proceedings of the Canadian Information Technology Security Symposium, May 2003. Jansen.

*Policy Expression and Enforcement for Handheld Devices*, NISTIR 6981, May 2003. Jansen et al.

*Assigning and Enforcing Security Policies on Handheld Devices*, Proceedings of the Canadian Information Technology Security Symposium, May 2002. Jansen et al.

PCT International Search Report dated Jan. 2, 2003 corresponding to PCT US02/21186.

Office Action dated Dec. 18, 2003 for U.S. Appl. No. 09/764,548, filed Jan. 18, 2001.

Office Action dated Dec. 22, 2003 for U.S. Appl. No. 09/591,034, filed Jun. 9, 2000.

Office Action dated Dec. 31, 2003 for U.S. Appl. No. 09/758,941, filed Jan. 10, 2001.

Office Action dated Dec. 31, 2003 for U.S. Appl. No. 09/645,028, filed Aug. 23, 2000.

Examiner's Report dated Jan. 30, 2009 corresponding to Australian Patent Application No. 2003284269, 2 pages.

International Search Report, PCT/US03/32960, Oct. 18, 2004, 6 pages.

* cited by examiner

JUMPING APPLICATION SECURITY SYSTEM

PRIORITY CLAIM

This application claims priority under 35 USC 119(e) and 120 from U.S. Provisional Patent Application Ser. Nos. 60/419,312 and 60/419,288, both filed on Oct. 16, 2002 and entitled "Jumping Application Security System" and "Mobile Application Morphing System And Method" respectively, both of which are incorporated herein by reference.

FIELD OF THE INVENTION

This invention relates generally to a jumping application security system and method and in particular to a jumping application provisioning system and method that may be implemented for jumping applications that execute on various devices.

BACKGROUND OF THE INVENTION

In traditional computing systems, communication between computers is either code (a software application)or data (a file containing information)and there is no notion of a program moving between hosts while it is being executed. Thus, with a typical computing system, a person may execute a software application (e. g., Microsoft Word) on his own computer and then forward the results of the execution of the software application (e. g., a Word document) to another user. The other user may then view the Word document by executing his own copy of Microsoft Word. A user may also send another user an executable software application file that the other user may download and execute on his own computer. However, these traditional computing systems do not recognize a single instantiation of a software program that may be executed by one or more different computers in order to complete the execution of the software application.

A jumping application, sometimes also called a jumping app, a mobile application, a mobile app, or a mobile agent, is a computer software application/program, or part of a computer program that can physically move from one computer to another (between hosts) while it is being executed: A jumping application's software may or may not have been previously installed on a particular computers prior to the arrival of the jumping application. The jumping applications are said to jump from one computer to another computer and the process of jumping from one computer to another computer is also referred to as a jump.

The process of initiating a jump between computers is commonly known as a dispatch. Typically, each jumping application will carry with it an ordered list or tree of hosts which the jumping application must visit during its execution, and such a list or tree is called the jumping application's itinerary. The computers that can receive and dispatch jumping applications are called hosts. The collection of hosts, computer networks, and software which executes and supports the jumping applications, and the jumping applications themselves, is called the jumping application system.

A jumping application typically has at least two parts: the state and the code. The state of the jumping application contains all of the data stored, carried, used, and/or computed by the particular jumping application. The code of the jumping application is the set of computer instructions which the host computer is intended to carry out on behalf of the jumping application during the execution of the jumping application by the particular host computer. In addition, a jumping application may have other parts, including an Access Control List (ACL), an itinerary, a datastore, an audit log, etc. A jumping application's software may or may not have been previously installed on the computers prior to the arrival of the jumping application.

Jumping applications have demonstrable benefits for computer systems. However, they also create security problems. In particular, a hostile host computer might tamper with the code, the state, or the configuration of a jumping application before dispatching it to another host, in order to attack that host or another part of the jumping application system. Thus, there is a need to ensure that a host computer cannot adversely alter the configuration of a jumping application.

Current implementations of jumping application systems support techniques to ensure that any code transmitted to a host computer comes from a location which is known (or believed) to be safe. This is accomplished by simply preventing any untrusted host from transmitting any executable code. Current implementations are binary: either a host can transmit code to other hosts, or a host cannot transmit code to another host.

However, current jumping application implementations do not adequately handle the situation in which an untrusted host needs to specify the behavior of a jumping application on another host. Thus, it is desirable to provide a system which allows an untrusted host to specify the behavior of a jumping application when that jumping application is on another host and it is to this end that the present invention is directed.

SUMMARY OF THE INVENTION

The security system and method in accordance with the invention allows an untrusted host to specify the behavior of a jumping application by describing it, rather than by providing code. With this technique, the security system will transmit and provide the needed code to other hosts on behalf of the untrusted host. Thus, the untrusted host never explicitly transmits code to other hosts thereby reducing the security threat posed by the untrusted host.

Thus, in accordance with the invention, a jumping application security system is provided wherein the jumping application security system may be a spoke and hub architecture or a peer-to peer network. The jumping application security system comprises a management and security console computer that executes instructions for controlling the security of a jumping application and one or more host computers connected to the console computer wherein each host computer executes the jumping application that jumps from host to host during execution. The security console further comprises means for monitoring the security of the jumping application as it jumps between a dispatching host and another host wherein information about the jumping application is communicated to the console computer, means for providing a list of allowable executable programs (or portions of executable programs), means for allowing a host to specify which executable program (or portion of an executable program) to transmit to other hosts, and means for having the security system transmit the specified executable program (or portion of an executable program) to other hosts. A method for jumping application security is also described.

Thus, in accordance with the invention, a computer implemented jumping application security console that maintains the security of a jumping application that is jumping between one or more hosts connected to the security console is provided. The security console comprises a security module that controls the security of a jumping application and a database that contains one or more pieces of code and a description of each piece of code, wherein each piece of code implements a particular behavior. The security module further comprises instructions that replace code from the jumping application that implements a first behavior with a piece of code from the database into the jumping application that implements the first behavior.

In accordance with another aspect of the invention, a computer implemented jumping application security console that maintains the security of a jumping application that is jumping between one or more hosts connected to the security console is provided. The security console comprises means for controlling the security of a jumping application and means for storing one or more pieces of code and a description of each piece of code, wherein each piece of code implements a particular behavior. The security controlling means further comprises means for removing code from the jumping application that implements a first behavior and means for inserting a piece of code into the jumping application that implements the first behavior.

In accordance with yet another aspect of the invention, a computer-implemented method for controlling the security of a jumping application in a jumping application system is provided. In the method, a request is received for a piece of code that implements a particular behavior for a jumping application and the code in the jumping application that implements the particular behavior is replaced with a piece of code that implements the particular behavior into the jumping application so that the jumping application has the particular behavior when it is executed by a host in the jumping application system.

DETAILED DESCRIPTION OF A PREFERRED EMBODIMENT

The invention is particularly applicable to a jumping application system for a client/server type jumping application computer system and it is in this context that the invention will be described. It will be appreciated, however, that the jumping application security system and method in accordance with the invention has greater utility since it may be used for the protection of any computing system and for any jumping application. For example, the inventive system may be used with wireless computing devices (e. g., cell phones, wireless e-mail devices, wireless computer devices and the like), it may also be utilized with peer-to-peer computer systems as well as any other type of computer system that is capable of executing a jumping application. To better understand the invention, a typical jumping application and an example of its execution will be provided.

Figure 1:
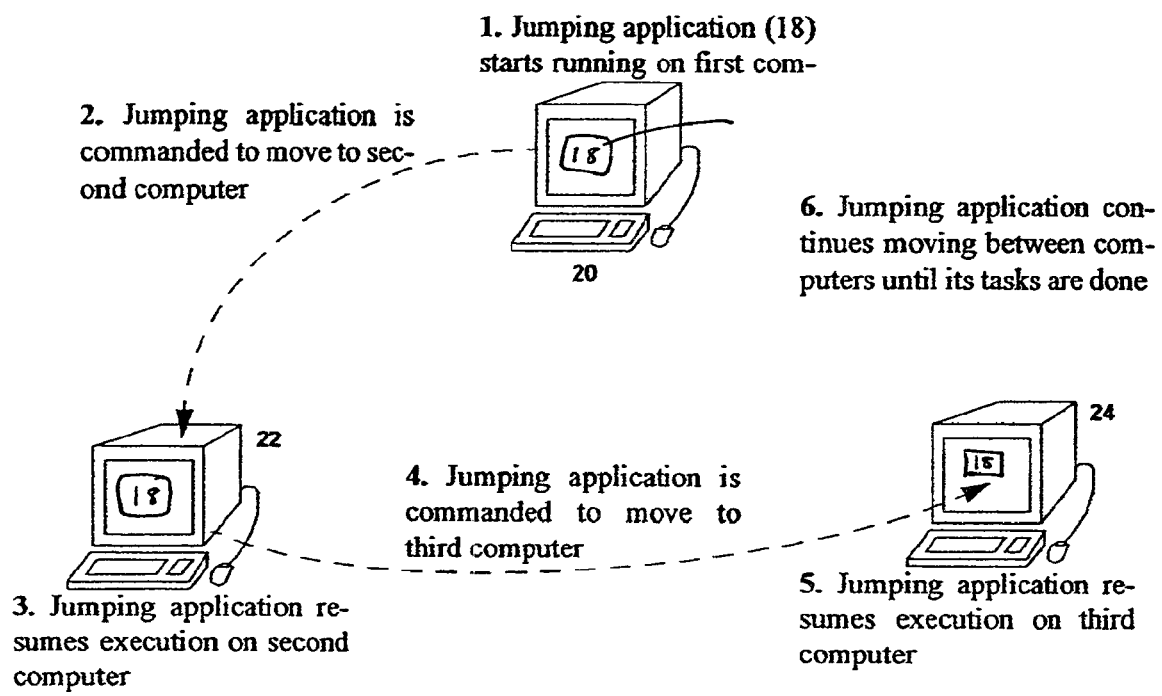
FIG. 1 illustrates a typical jumping application.

FIG. 1 illustrates a typical jumping application 18 and its operation. In particular, the jumping application may start its execution on a first computer 20. At some point, the jumping application 18 is instructed to move to a second computer 22 and the jumping application jumps (e.g., is communicated to or is sent) to the second computer. Once at the second computer, the jumping application resumes its execution on the second computer. At some later time, the jumping application is instructed to move to a third computer 24 and the jumping application jumps to the third computer and resumes its execution on the third computer. In this manner, the jumping application can execute on one or more different computers at different times. To understand the concept of a jumping application, an example of a typical jumping application will now be provided.

Figure 2:
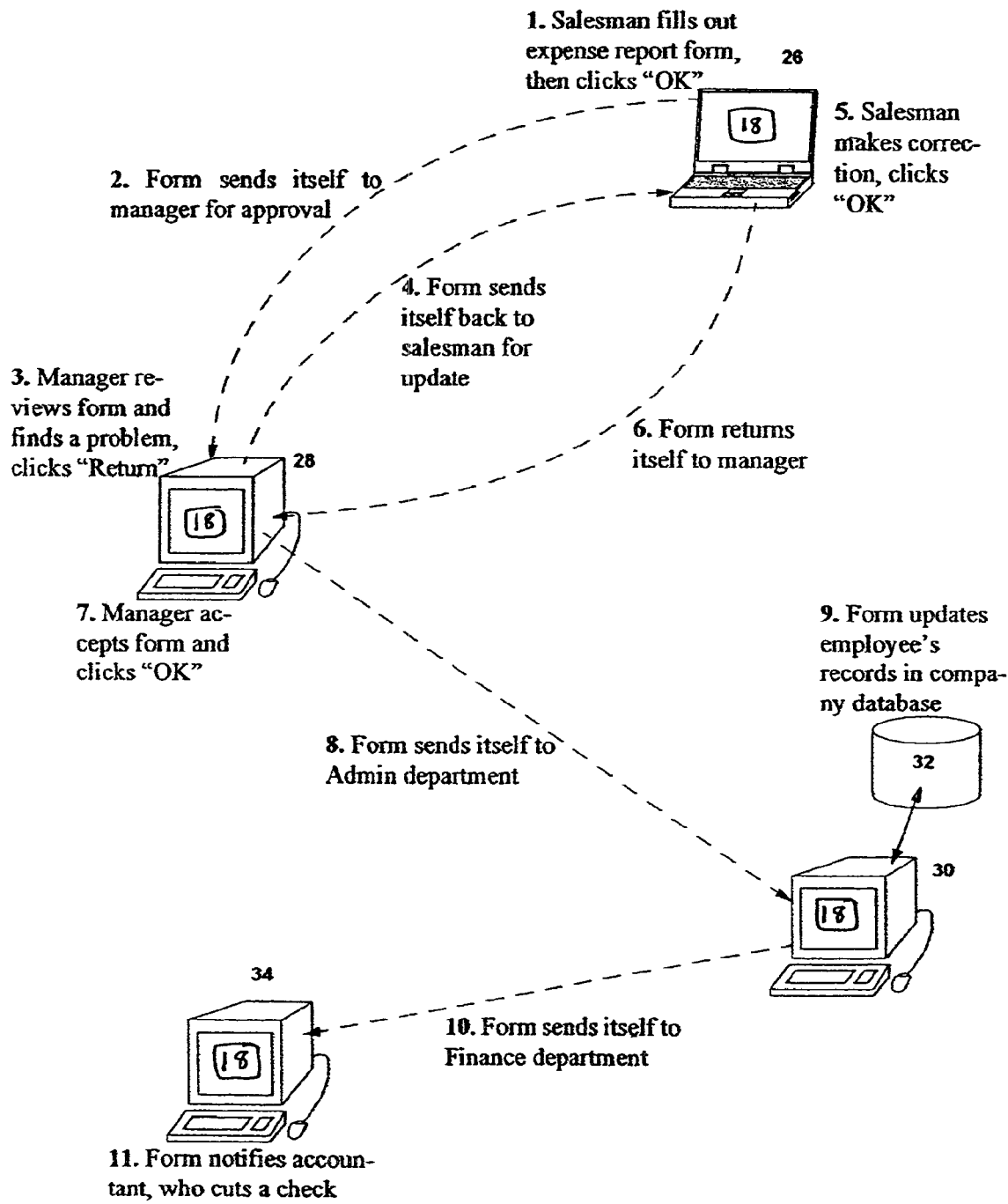
FIG. 2 illustrates an example of the execution of a typical jumping application.

FIG. 2 is a diagram illustrating an example of a typical jumping application 18 and in particular, an intelligent expense report form. In this example, the jumping application facilitates the expense report process by automatically performing some functions. In particular, a salesman at a laptop computer 26 may initially fill out an expense report form and click OK when the expense report is ready. Automatically, the jumping application then sends itself to a manager's computer 28 for approval by the manager. In this example, the manager finds a problem with the form and returns it to the salesman so that the form automatically sends itself back to the salesman's computer 26 for an update. Next, the salesman makes the necessary corrections and clicks OK to send it automatically back to the manager's computer 28. With the further updates, the manager accepts the expense form and clicks "OK'. The jumping expense report form then automatically sends itself to a computer 30 in the administration department. The jumping expense form then executes on the administration computer and updates a database 32 with the new information in the expense form. Next, the jumping expense report automatically sends itself to a computer 34 of the accountant. The jumping expense report then automatically starts to execute on the accountant's computer and notifies the accountant that a check is needed so that the accountant can cut the check for the salesman. Thus, the jumping application has automated much of the expense report submission process so that the people involved in the process do not have to worry about ensuring that the expense report is approved. Now, the jumping application security system in accordance with the invention will be described.

Figure 3:
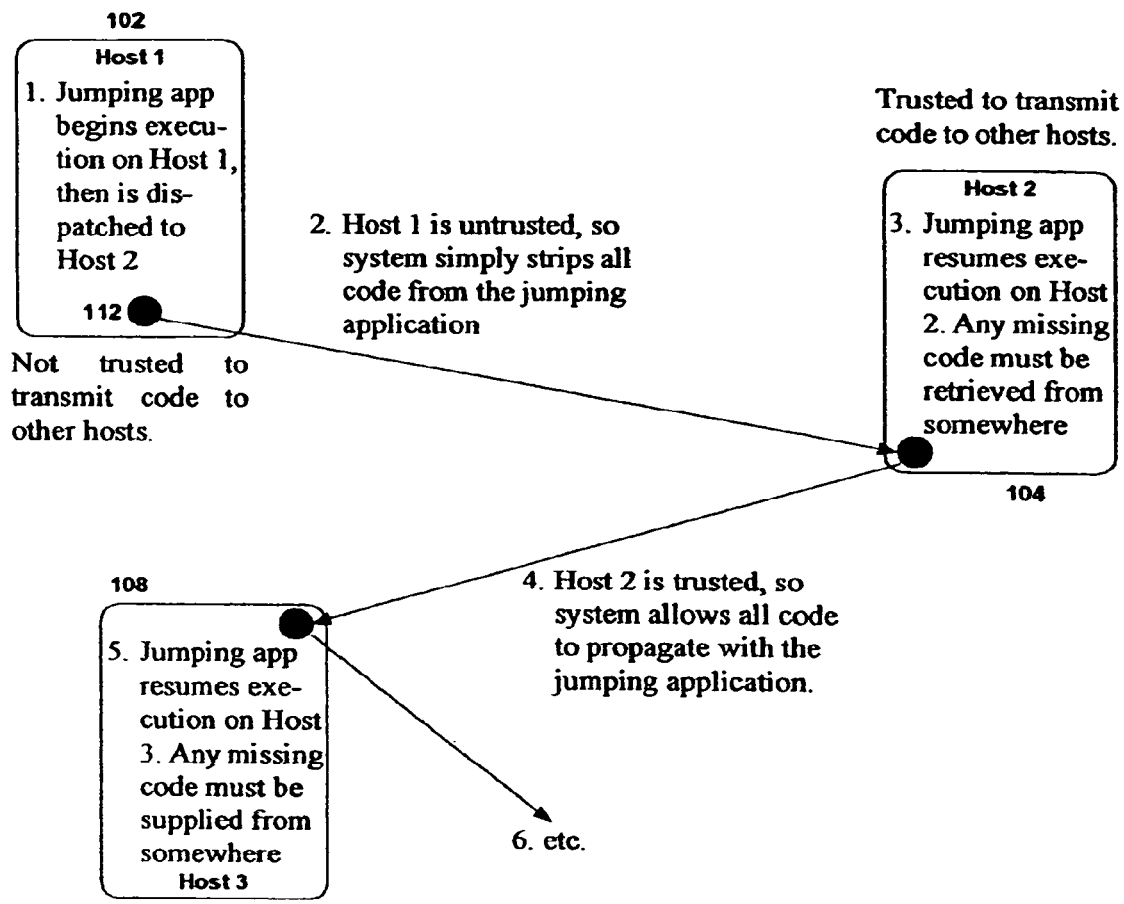
FIG. 3 is a diagram illustrating how conventional jumping application systems handle the code of a jumping application.

FIG. 3 illustrates earlier techniques for managing the code of a jumping application. With earlier techniques, a host computer 102, Host 1, would instantiate a jumping application 112, and then later dispatch it to the second host 104, Host 2. In this example, Host 1 is untrusted, so the jumping application system simply strips all of the code from the jumping application. The jumping application system would then forward the jumping application to Host 2 without any code since the code has been stripped from the jumping application. Later, the jumping application would be dispatched to Host 3. In this example, Host 2 is trusted, so any code included with the jumping application would be transmitted to Host 3, unmodified. This would be repeated on each jump, and the system would determine if the code should be transmitted or not depending on whether or not the sending host is trusted. Thus, with previous jumping application techniques, a jumping application might arrive at a host without any code. In this case, the jumping application would need to retrieve any needed code from some trusted source, which may or may not be available. If the trusted source is not available, an error condition will result and the jumping application will stop its proper operation. Now, a jumping application security system in accordance with the invention that overcomes the limitations of the typical jumping application security system will be described.

Figure 4:
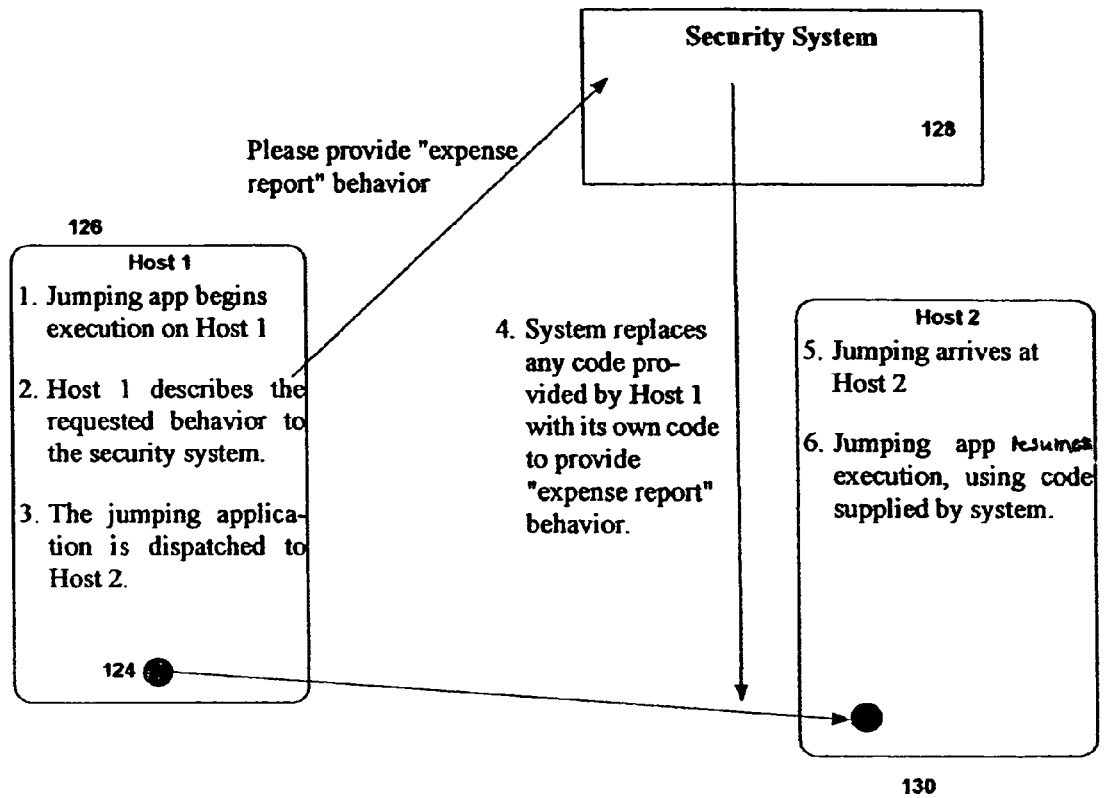
FIG. 4 is a diagram illustrating an example of a jumping application security system in accordance with the invention that improves on current jumping application techniques.

FIG. 4 illustrates an example of a jumping application security system 128 in accordance with the invention. In this security system in accordance with the invention, the jumping application system can provide code to a jumping application based on a description of the desired behavior provided by the jumping application. Thus, the security of the jumping application is maintained since all code is being provided by the security system (which is trusted) yet the code required by the jumping application is being provided to the jumping application so that the jumping application may continue its operation.

In this example, a jumping application 124 is instantiated on the first host 126, Host 1. In accordance with the invention, the jumping application (through Host 1 communicating with the security system 128) describes to the security system 128 what behavior it wants. In other words, the jumping application requires some code in order to execute/implement a particular function and describes that function to the security system. In this example, the jumping application wants the behavior of an expense report. Later, the jumping application is dispatched to a second host 130, Host 2. Prior to sending the jumping application to Host 2, in accordance with the invention, the security system 128 will remove any code provided by Host 1, such as any expense report code, and replace it with its own code that provides the "expense report" behavior/functionality. Then the security system 128 forwards the jumping application to the second host 130, Host 2 with the security system's "expense report" code so that the jumping application with the "expense report" functionality (in this example) continues its execution on Host 2. More generally, the security system inserts its code for the desired functionality into the jumping application so that the jumping application with the desired functionality continues its execution on the next host. The above process is repeated for each jump made by the jumping application. Thus, with each jump, the jumping application security system replaces the transmitted code with its own code for the desired behavior/functionality so that the jumping application has the code necessary to implement the desired functionality while ensuring the security of the jumping application since no host must be trusted in accordance with the invention. Now, an example of a jumping application security system in accordance with the invention will be described.

Figure 4A:
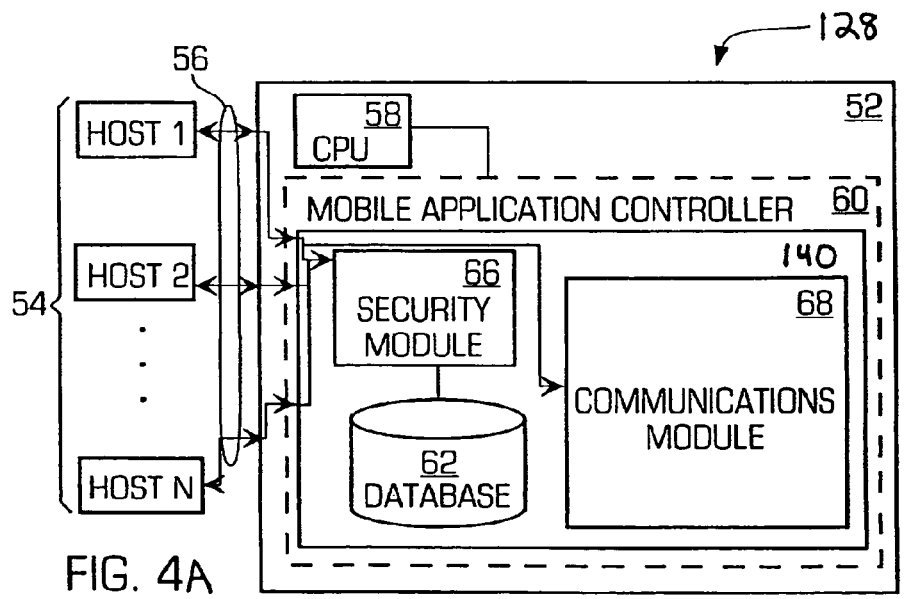
FIG. 4A is a diagram illustrating an example of a preferred embodiment of a jumping application security system in accordance with the invention.

FIG. 4A is a diagram illustrating a client/server jumping application security system 128 in accordance with the invention. As described above, this architecture of the jumping application security system is an example of an implementation of the jumping application security system as the jumping application security system may be implemented using various different architectures. In this example, the system 128 may include a server computer 52 and one or more host computers 54, such as Host 1, Host 2 and Host N, that may be connected to the server computer by a computer network 56, such as a wide area network, the Internet, a local area network, the World Wide Web, a telephone line and a modem or the like. The computer network permits the server and hosts to communicate data between each other using well known protocols and data formats. Each host may be a typical computer system that includes the well known computing resources, such as at least a CPU and a memory, for executing a software application such as a jumping application. Each host may be a personal computer, a laptop, a server computer, a work station, a personal digital assistant, a Pocket PC computer, a cellular phone, etc. with sufficient computing power to execute a jumping application.

The server 52 may include one or more CPUs 58 and a memory 60 along with a persistent storage device (not shown) for permanently storing one or more software applications or modules that may be executed by the CPU by loading the software applications or modules into the memory. The server may also include well known input/output devices that are not shown as well as a device for connecting to the computer network 56, such as a modem, DSL modem, etc. The server may also include a database 62 that stores one or more jumping applications along with information about the jumping applications as described below. The database 62 may further include one or more different pieces of code that implement one or more different functions/behaviors wherein the pieces of code may be inserted into a jumping application as described above. When the server computer 52 is being utilized as the jumping application security system, the memory of the server has a jumping application controller module 140 (also known as a management and security console) stored in it that, when executed by the CPU, control the security of the one or more jumping application(s) in the jumping application system and the hosts as described below. In a preferred embodiment, the jumping application controller module 140 may be one or more software application or modules, but the controller may also be implemented using hardware.

In a preferred embodiment, the jumping application controller 64 may include a security software module 66 and a communications software module 68. The security module may control the operation of the jumping application security system and maintain the security of the system, such as by inserting the code with the appropriate behavior into a jumping application upon request from the jumping application. The communications module may control the communications with the hosts associated with/connected to the jumping application security system, such as by receiving the request for code with a particular behavior from a host and by sending the code with the particular behavior to the jumping application. Thus, the combination of the security system software may solve the problems with typical jumping application systems so that: 1) the security of the jumping application system is maintained and a host cannot introduce code into the jumping application; and 2) each jumping application receives the code necessary to implement a particular behavior.

Figure 5:
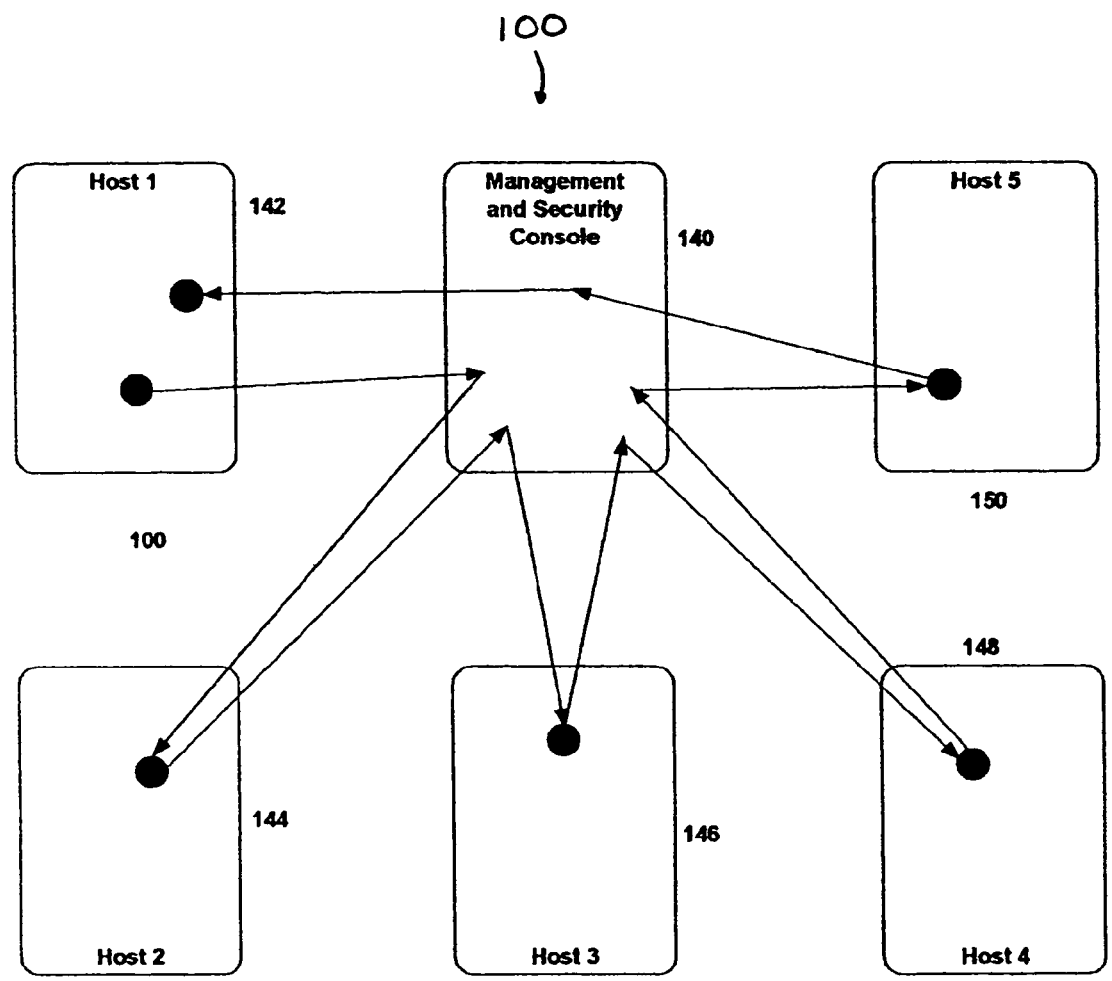
FIG. 5 is a diagram illustrating the architecture of the preferred embodiment of the jumping application security system.

FIG. 5 illustrates the architecture of a preferred embodiment of a jumping application system 100 in accordance with the invention. In this architecture, there is the Management and Security Console 140 (MaSC) which forms the hub of a spoke-and-hub arrangement. In this arrangement, the hosts 142, 144, 146, 148, and 150 never communicate directly with each other. Instead, the hosts communicate only with the MaSC 140. This in turn implies that on each jump, each jumping application must pass through the MaSC 140 so that the MaSC controls the jumping application and its security. In the preferred embodiment of the invention, a trusted party or system administrator has access to the MaSC 140, where this trusted party can provide code (for each particular behavior/functionality) which is known to be safe. This arrangement of the preferred embodiment allows the MaSC 140 to substitute known safe code on each jump. This code can come from the known safe code provided by the trusted party at the MaSC.

Figure 6:
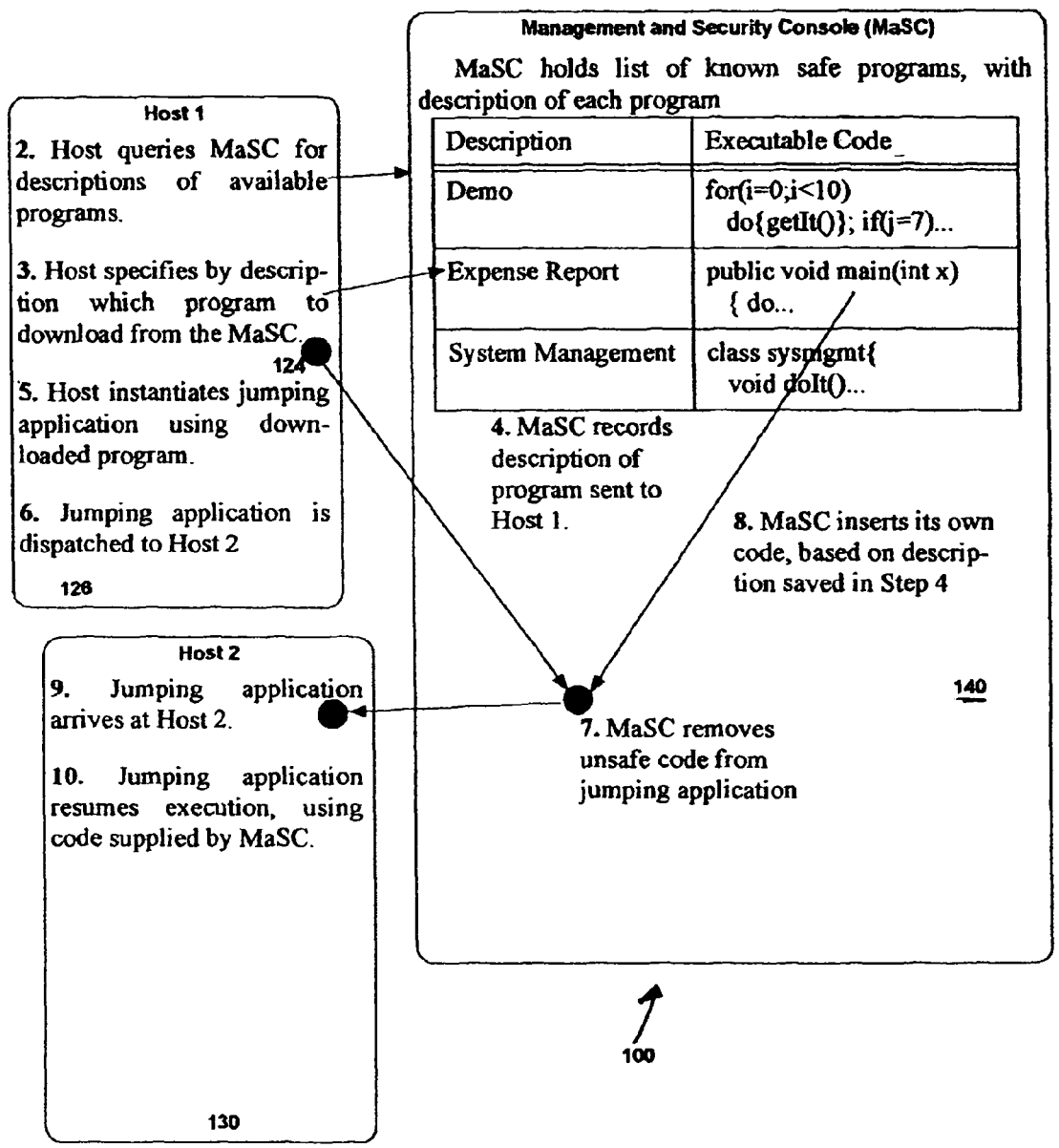
FIG. 6 is a diagram illustrating the details of the preferred embodiment of the jumping application security system in accordance with the invention.

FIG. 6 illustrates the details of the preferred embodiment of the jumping application system 100, based on the architecture of FIG. 5, that includes the management and security console 140. In this example, the jumping application 124 is instantiated on Host 1 126, and later dispatched to Host 2 130. The process by which the jumping application 124 jumps between the hosts and receives safe code from the MaSC 140 in accordance with the invention will now be described. Each of the steps of the preferred embodiment described below may be implemented, in the preferred embodiment, as one or more instructions (computer code executing on the management and security console and/or a host computer) that implement the operations described below. In accordance with the invention, these instructions may be written in various well known programming languages or other programming languages as the invention is not limited to instructions written in any particular programming language.

In accordance with the invention, the MaSC 140 contains (in the database 62 shown in FIG. 4A) a list of previously developed programs (safe programs) and the software code for each program. Each of these programs is suitable as a jumping application or portion of a jumping application. These programs (pieces of software code) are supplied to the system administrator (and the MaSC 140) from trusted parties so that each piece of code is known to be safe to use in a jumping application. Each of these programs has a description as well as the associated code as shown. In step 2, Host 1 126 queries the MaSC 140 for a list of descriptions of the available programs on the MaSC. Each item in the list is a description (including the particular behavior/functionality) of one of the programs on the MaSC. In step 3, Host 1 selects the desired program(s) from the list of descriptions downloaded in Step 2, which are required to implement a particular behavior(s) within the jumping application. Host 1 then sends a message to the MaSC requesting the executable piece(s) of code. The executable code is specified using a description from the list of Step 2. In step 4, the MaSC 140 provides the specified code to Host 1 and records what code was provided for the jumping application 124 at Host 1 so that the MaSC 140 maintains a list of the code being provided to each jumping application.

In step 5, Host 1 uses the code received in Step 3 by inserting that code into the jumping application and instantiating the jumping application 124 with the inserted code. In step 6, the jumping application is dispatched to Host 2 130 in accordance with the code contained in the jumping application. In step 7, in accordance with the preferred embodiment, the jumping application is sent to the MaSC, prior to being sent to Host 2 130, where the MaSC then removes any code from the jumping application. In step 8, using the information recorded in Step 4, the MaSC determines which program(s)/code to supply with the jumping application, and adds those piece(s) of code to the jumping application. In step 9, in accordance with the preferred embodiment, the jumping application is then forwarded to Host 2 130 from the MaSC 140 and the jumping application arrives at Host 2. In step 10, the jumping application resumes execution on Host 2, using the code supplied by the MaSC in Step 8 so that the jumping application has the required behavior (using the code supplied by the MaSC 140), but unsafe code for the behavior is not inserted into the jumping application. Thus, this arrangement of the preferred embodiment allows the MaSC to substitute known safe code on each jump.

While the foregoing has been with reference to a particular embodiment of the invention, it will be appreciated by those skilled in the art that changes in this embodiment may be made without departing from the principles and spirit of the invention, the scope of which is defined by the attached claims.

The invention claimed is:

1. A computer implemented jumping application security console that maintains the security of a jumping application that is jumping between two or more hosts connected to the security console though a network, the security console comprising:
   a security module that controls the security of a jumping application;
   a database that contains one or more pieces of code and a description of each piece of code, wherein each piece of code implements a particular behavior; and
   wherein the security module further comprises instructions to replace code from the jumping application that implements a first behavior with a piece of code from the database into the jumping application that implements the first behavior when the jumping application is received at the security console during a jump between hosts, and where the code is replaced for each jump of the jumping application between hosts.

2. The console of claim 1, wherein the instructions that replace code further comprise instructions to remove any existing code in the jumping application and instructions to insert a piece of code from the database into the jumping application that implements the particular behavior.

3. The console of claim 1, wherein the security module further comprises instructions to receive a request for a piece of code from the database, by a host, that implements a particular behavior for a jumping application.

4. The console of claim 1, wherein the instructions to replace the code further comprise instructions to remove the code from the jumping application, instructions to store a list of the code removed from the jumping application, and instructions to insert a piece of code from the database into the jumping application based on the list of code removed from the jumping application.

5. A computer implemented jumping application security console that maintains the security of a jumping application that is jumping between two or more hosts connected to the security console though a network, the security console being distinct from each of the two or more hosts, the security console comprising:
   means for controlling the security of a jumping application;
   means for storing one or more pieces of code and a description of each piece of code, wherein each piece of code implements a particular behavior; and
   wherein the security controlling means further comprises means for replacing code from the jumping application that implements a first behavior with a piece of code from the database into the jumping application that implements the first behavior when the jumping application is received at the security console during a jump between hosts, and where the code is replaced during each jump between hosts.

6. The console of claim 5, wherein the replacing means further comprises means for removing any existing code in the jumping application and means for inserting a piece of code from the means for storing that implements the particular behavior into the jumping application.

7. The console of claim 5, wherein the security module further comprises means for receiving a request for a piece of code from the means for storing, by a host, that implements a particular behavior for a jumping application.

8. The console of claim 5, wherein the replacing means further comprises means for removing the code from the jumping application, means for storing a list of the code removed from the jumping application, and means for inserting a piece of code of from the means for storing into the jumping application based on the list of code removed from the jumping application.

9. A computer-implemented method for controlling the security of a jumping application in a jumping application system, the jumping application system including a plurality of distinct hosts and a security console distinct from the plurality of hosts, the method comprising:
  receiving the jumping application at the security console from a host;
  identifying a piece of code in the jumping application that implements a particular behavior;
  removing the identified piece of code in the jumping application that implements the particular behavior each time the jumping application jumps between hosts so that the jumping application does not include the piece of code when it is executed by a next host in the jumping application system; and
  sending the jumping application to the next host.

10. The method of claim 9, further comprising replacing the identified piece of code with a replacement piece of code including removing the existing piece of code in the jumping application and then inserting a replacement piece of code that implements the particular behavior into the jumping application.

11. The method of claim 9, further comprising:
  receiving a request, from the host, for code that implements the particular behavior for the jumping application; and
  identifying available code in a database; and
  receiving a selection, from the host, of and selecting, by the host, the piece of code to be added in the jumping application.

12. The method of claim 11, wherein adding the selected piece of code further comprises downloading the piece of code to the host in response to the selection of the piece of code by the host for insertion into the jumping application to implement the particular behavior.

13. The method of claim 10, wherein replacing the code further comprises removing the code from the jumping application by the security console, storing a list of the code removed from the jumping application and inserting the replacement piece of code into the jumping application by the security console based on the list of code removed from the jumping application.

14. A jumping application security system, comprising:
  a security console computer system that control the security of a jumping application in the jumping application security system;
  one or more host computers connected to the security console computer system through a computer network, wherein each host computer executes a jumping application; and
  wherein the security console computer system further comprises a database that contains one or more pieces of code and a description of each piece of code, wherein each piece of code implements a particular behavior and a security module that comprises instructions that replace code from the jumping application that implements a first behavior with a piece of code from the database when the jumping application is received at the security console during a jump between hosts, and where the code is replaced into the jumping application that implements the first behavior each time the jumping application jumps between hosts.

15. The system of claim 14, wherein the instructions to replace the code further comprise instructions to remove any existing code in the jumping application and instructions to insert a piece of code from the database into the jumping application that implements the particular behavior.

16. The system of claim 14, wherein the console further comprises instructions to receive a request for a piece of code from the database that implements a particular behavior for a jumping application for a host computer.

17. The system of claim 16, wherein the instructions to receive a request further comprise instructions on the host computer to generate a query of the pieces of code contained in a database of the security console and instructions on the host computer to select a particular piece of code to be replaced in the jumping application.

18. The system of claim 17, wherein the instructions to replace the code further comprise instructions to download the selected piece of code to the host computer in response to the selection of the piece of code by the host and instructions on the host computer to insert the selected piece of code into the jumping application to implement the particular behavior.

19. The system of claim 14, wherein the instructions to replace the code further comprise instructions in the security console to remove the code from the jumping application, instructions in the security console to store a list of the code removed from the jumping application, and instructions in the security console to insert a piece of code from the database into the jumping application by the security console based on the list of code removed from the jumping application.

20. A server computer for a jumping application security system, the server comprising:
  a processor;
  a memory connected to the processor;
  a database connected to the processor that contains one or more pieces of code and a description of each piece of code, wherein each piece of code implements a particular behavior; and
  wherein the memory further comprises instructions that replace code from a jumping application received from a first host through a network that implements a first behavior with a piece of code from the database into the jumping application that implements the first behavior each time the jumping application including code that implements the first behavior jumps from the first host to a second host, the first host and the second host being distinct from the server computer.

21. The server of claim 20, wherein the instructions to replace the code further comprise instructions to remove any existing code in the jumping application and instructions to insert a piece of code from the database into the jumping application that implements the particular behavior.

22. The server of claim 21, wherein the instructions to replace the code further comprise instructions to download the piece of code to the first host in response to the selection of the piece of code by the first host and instructions on the first host to insert the piece of code into the jumping application to implement the particular behavior.

23. The server of claim 20, wherein the instructions to replace the code further comprise instructions in the security console to remove the code from the jumping application, instructions in the security console to store a list of the code removed from the jumping application, and instructions in the security console that insert a piece of code from the database into the jumping application by the security console based on the list of code removed from the jumping application.

24. A computer-implemented method comprising:
  receiving a jumping application at a server from a first host during a jump from the first host to a second host;

determining whether the first host has been designated as an untrusted host;

when the first host is an untrusted host, determining whether the received jumping application includes code that implements a particular behavior and when the jumping application includes the code, replacing the code in the jumping application that implements a particular behavior with a piece of code that implements the particular behavior in the jumping application so that the jumping application has the particular behavior when it is executed by the second host; and forwarding the jumping application to the second host.

25. A jumping application security system, comprising:

a security console computer system that control the security of a jumping application in the jumping application security system;

one or more host computers connected to the security console computer system through a computer network, wherein each host computer executes a jumping application; and wherein the security console computer system further comprises a database that contains one or more pieces of code and a description of each piece of code and a security module that comprises instructions that replace code from the jumping application with a piece of code from the database when the jumping application is received at the security console during a jump between hosts and where the code is replaced each time the jumping application jumps between hosts.

26. The computer implemented jumping application security console of claim 1, where the piece of code corresponds to a program for implementing the particular behavior.

* * * * *

UNITED STATES PATENT AND TRADEMARK OFFICE
CERTIFICATE OF CORRECTION

| | | |
|---|---|---|
| PATENT NO. | : 7,735,134 B2 | Page 1 of 1 |
| APPLICATION NO. | : 10/686886 | |
| DATED | : June 8, 2010 | |
| INVENTOR(S) | : Christopher Rygaard | |

It is certified that error appears in the above-identified patent and that said Letters Patent is hereby corrected as shown below:

Column 9, Line 1 at Claim 8; replace:
"ing a piece of code of from the means for storing into the" with
-- ing a piece of code from the means for storing into the --

Signed and Sealed this
Twenty-second Day of March, 2011

David J. Kappos
*Director of the United States Patent and Trademark Office*